United States Patent [19]

Nogues et al.

[11] Patent Number: 5,047,488

[45] Date of Patent: Sep. 10, 1991

[54] SUSPENDED EMULSION POLYMERIZATION OF VINYL MONOMERS

[75] Inventors: Pierre Nogues; Francois Erard, both of Bernay, France

[73] Assignee: Atochem, Puteaux, France

[21] Appl. No.: 169,585

[22] Filed: Mar. 17, 1988

[30] Foreign Application Priority Data

Mar. 17, 1987 [FR] France ................... 87 03636

[51] Int. Cl.$^5$ .................... C08F 2/32; C08F 14/06
[52] U.S. Cl. ........................ 526/65; 526/87;
526/75; 526/88; 526/193; 526/199; 526/200;
526/201; 526/202; 526/216; 526/217; 526/225;
526/249; 526/255; 526/329.7; 526/330;
526/341; 526/344.2; 526/344.3; 526/345;
526/909
[58] Field of Search ............... 526/65, 87, 88, 344.2,
526/344.3, 345, 909, 910, 911, 915, 75, 330, 341,
201, 249, 255, 329.7

[56] References Cited

U.S. PATENT DOCUMENTS

| | | | |
|---|---|---|---|
| 3,547,857 | 12/1970 | Murray | 260/35.5 |
| 3,678,021 | 7/1972 | Chatelain et al. | 526/65 |
| 3,917,548 | 11/1975 | Harrington | 526/344.3 X |
| 4,327,003 | 4/1982 | Hao et al. | 523/336 |
| 4,458,057 | 7/1984 | Basu | 526/344.3 X |
| 4,668,707 | 5/1987 | Hawrylko | 526/344.3 X |

FOREIGN PATENT DOCUMENTS 1203524 8/1970 United Kingdom .

OTHER PUBLICATIONS

Modern Plastics Encyclopedia, J. Agranoff (ed.), McGraw-Hill, Inc., N.Y., 104, 1980.
Hackh's Chemical Dictionary, Fourth Edition, J. Grant (ed.), McGraw-Hill, Inc., N.Y., 712, 1969.

*Primary Examiner*—Fred Teskin
*Attorney, Agent, or Firm*—Burns, Doane, Swecker & Mathis

[57] ABSTRACT

Vinyl polymers, e.g., the homo- and copolyvinyl chlorides, are prepared in one or more stages, to a degree of conversion of at least 50%, by suspended emulsion polymerizing at least one vinyl monomer, e.g., vinyl chloride, said at least one monomer having dispersed therein finely divided droplets of an aqueous solution of at least one component of a polymerization initiating system, and wherein the amount of water in said aqueous solution constitutes at least 19%, and preferably at least 20% by weight of the at least one monomer.

26 Claims, No Drawings

SUSPENDED EMULSION POLYMERIZATION OF VINYL MONOMERS

BACKGROUND OF THE INVENTION

1. Field of the Invention

The present invention relates to the preparation of polymers and copolymers, essentially of vinyl type, which are insoluble in their monomeric or comonomeric compositions, and, more especially, to the preparation of such polymers by suspended emulsion polymerization.

By the phrase "suspended emulsion polymerization" is intended the polymerization of at least one monomer in the presence of an initiating system, at least one of the constituents of which is water-soluble, and wherein said initiating system comprises a finely divided aqueous phase dispersed in the monomer(s).

2. Description of the Prior Art

It is known to this art to prepare polymers and copolymers, essentially of vinyl type, which are insoluble in their monomeric or comonomeric starting materials, by polymerization in suspended emulsion entailing dispersing, in a finely divided form and in small quantities, an aqueous solution of at least a part of an initiating system in a monomeric or comonomeric composition of vinyl type, essentially based on vinyl chloride, and then effecting polymerization of such composition. According to this process, the quantity of the aqueous solution does not exceed 10% by weight of the monomeric or comonomeric starting material.

This process has been described in French Patent No. 69,01,008, published under No. 2,029,247, and in its Certificates of Addition thereto, No. 69/37,326, published under No. 2,070,251 and No. 69/37,327, published under No. 2,070,922.

This process enables the production of polymers and copolymers consisting of particles, the mean diameter of which ranges from 0.1 to 2,000 $\mu$m and the apparent density of which ranges from 0 10 g/cm$^3$ to over 0.70 g/cm$^3$. Compared with the bulk polymerization processes, this particular process results in the formation of smaller amounts of build-up, as well as the weaker adhesion of such build-up to the walls of the reactors.

In the case of the polymerization of a monomeric or comonomeric composition based on vinyl chloride, at a given polymerization temperature, this process produces polymers and copolymers whose viscosity index, determined according to ISO International Standard 174, is 5 to 10 ml/g higher than that of the polymers and copolymers produced, all other parameters remaining unchanged, according to the other techniques of polymerization and particularly according to the bulk polymerization techniques. It follows that, in order to produce a polymer or copolymer of a given viscosity index, the operation is carried out at a higher polymerization temperature, resulting in a reduced polymerization time.

However, in the case of polymerization of a monomeric or comonomeric composition based on vinyl chloride, such process does not enable the production, at a degree of conversion of the monomeric or comonomeric composition of greater than 10%, of polymers and copolymers consisting of particles having a mean diameter greater than 10 $\mu$m and having both an apparent density greater than 0.50 g/cm$^3$ and a porosity, evaluated by plasticizer uptake at ambient temperature, greater than 15 g of di-2-ethylhexyl phthalate per 100 g of resin.

SUMMARY OF THE INVENTION

Accordingly, a major object of the present invention is the provision of an improved suspended emulsion polymerization process that does not suffer from the disadvantages and drawbacks to date characterizing the state of this art.

In the case of polymerization of a monomeric composition based on vinyl chloride, the process of the invention enables the production, with degree of conversion of the monomeric or comonomeric composition of greater than and even capable of exceeding 65%, of particulate polymers and copolymers having a mean diameter greater than 10 $\mu$m and exhibiting at the same time an apparent density capable of exceeding 0.55 g/cm$^3$ and a porosity, evaluated by plasticizer uptake at ambient temperature, capable of exceeding 30 g of di-2-ethylhexyl phthalate per 100 g of resin.

Briefly, the present invention features the polymerization of vinyl type monomers or comonomers having a finely divided aqueous solution of at least a part of an initiating system dispersed therein, and wherein the amount of water in said aqueous solution constitutes at least 19% and preferably at least 20% by weight relative to said monomers or comonomers.

DETAILED DESCRIPTION OF THE PREFERRED EMBODIMENTS OF THE INVENTION

More particularly according to the present invention, said amount of water is generally correspondingly higher, all other parameters remaining unchanged, the higher the intended degree of conversion of the monomer(s). It is limited at the upper end only by the value above which it is not possible to disperse the aqueous solution in the monomeric or comonomeric composition. Said amount generally is not more than 100% and preferably not more than 50% by weight relative to the monomeric or comonomeric composition.

In a first embodiment of the process of the invention, after formulation of the aqueous solution of at least a part of the initiating system, a finely divided dispersion of this solution in the monomeric or comonomeric composition of vinyl type is first produced, and then the reaction mixture thus prepared is polymerized in a single stage, carried out under moderate stirring.

In a second embodiment of the process of the invention, the operations of dispersing the finely divided aqueous solution of at least a part of the initiating system in the monomeric or comonomeric composition of vinyl type and of commencing the polymerization under high-turbulence stirring are carried out conjointly in a first stage, up to a degree of conversion generally ranging from 1% to 50% and preferably from 3% to 25%. Next, a complementary monomeric or comonomeric composition of vinyl type (identical with or different from that employed during the first stage) is optionally added to the reaction mixture, and then, in a second stage, the reaction mixture is polymerized under slow stirring, but nonetheless sufficient to avoid reagglomeration of the developing particles In a third embodiment of the process of the invention, the operations of dispersing the finely divided aqueous solution of at least a part of the initiating system in the monomeric or comonomeric vinyl composition and of prepolymerization of this composition under high-turbulence stirring are carried out conjointly in a first stage, in an apparatus designated a prepolymerizer, up to a degree of conversion generally ranging from 1% to 30% and preferably from 3% to 15%. Then, in a second stage, the reaction mixture is subjected to a final polymerization under slow stirring, but nonetheless sufficient to avoid reagglomeration of the developing particles.

According to the third embodiment of the process of the invention, a complementary monomeric or comonomeric composition, identical with or different from that employed during the first stage, may be added to the reaction mixture between the two stages. The addition of such complementary monomeric or comonomeric composition to the reaction mixture may be carried out before, during, or after the transfer of the reaction mixture to the polymerizer.

A preliminary operation of dispersing, in a finely divided form, an aqueous solution of at least a part of the initiating system in a monomeric or comonomeric composition of vinyl type may also be carried out and be followed by the dissolution of the complementary remainder of the initiating system in a monomeric or comonomeric composition of vinyl type, either conjointly with a single- or two-stage polymerization operation, or with a prepolymerization operation followed by a final polymerization.

In the case where an initiating system including several water-soluble constituents is employed, it is also possible to introduce the aqueous solutions of said constituents separately into the reaction mixture at various stages of the polymerization process.

The process of the invention may also be carried out continuously, especially according to the techniques described in the Certificates of Addition referred to above.

According to the process of the invention, at least one emulsifier and/or suspension agent may be introduced into the reaction mixture, in most cases by means of the aqueous solution of at least a part of the initiating system. In the case of the preparation of polymers or copolymers based on vinyl chloride containing particles of a mean diameter greater than approximately 10 μm, the process of the invention produces, in the absence of emulsifier, particulate resins, the particle shape of which is close to spherical, and, in the presence of emulsifier, all other parameters remaining unchanged, resins in which the particles have a shape which is less spherical and which are less fine.

Exemplary of useful emulsifiers, representative are those:

(i) of cationic type, such as quaternary ammonium salts of the general formula:

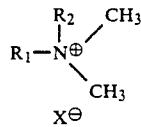

wherein $R_1$ and $R_2$ are aliphatic or aromatic radicals and X is a halogen atom;

(ii) of anionic type, such as fatty acid soaps, alkali metal alkyl sulfates, alkali metal alkylsulfonates, alkali metal alkylarylsulfonates, alkali metal alkylsulfosuccinates and alkali metal alkyl phosphates; and (iii) of nonionic type, such as the polycondensates of ethylene and/or propylene oxide with various hydroxylated organic compounds such as fatty alcohols and nonylphenols, with the proviso that said emulsifiers can be used either alone or in any admixture.

Exemplary suspension agents are, for example, vinyl alcohols, cellulose derivatives such as methyl cellulose and carboxycellulose, and gelatins.

The proportion of emulsifier and/or suspension agent which is optionally employed generally ranges from 0% to 2% and preferably from 0% to 0.5% by weight relative to the monomer(s) employed.

According to the invention, it is advisable to employ monomers and comonomers exhibiting some degree of solubility in the finely dispersed aqueous phase defined above.

Also according to the invention, the polymer or copolymer formed must be insoluble in the monomeric or comonomeric composition which has not reacted.

Especially representative monomeric or comonomeric compositions are those in which at least one of the monomers is selected from among vinyl chloride, vinylidene chloride, vinyl acetate, acrylonitrile, vinylidene fluoride, tetrafluoroethylene, chlorotrifluoroethylene, alkyl acrylates such as methyl acrylate, alkyl methacrylates such as methyl methacrylate, olefins such as ethylene and propylene, provided that the copolymer formed is essentially insoluble in the unreacted comonomeric composition.

Preferred are monomeric or comonomeric compositions selected from among vinyl chloride alone, compositions based on vinyl chloride and at least one olefin comonomer copolymerizable therewith, such as ethylene, propylene, 1-butene, 2-butene, isobutene, 4-methyl-1-pentene, compositions based on vinyl chloride and vinyl acetate, compositions based on vinyl chloride, vinyl acetate and at least one olefin, and compositions based on vinyl chloride and vinylidene chloride, provided that the copolymer formed is essentially insoluble in the unreacted comonomeric composition.

Exemplary such comonomeric compositions well suited for carrying out the invention are:

(a) comonomeric compositions based on vinyl chloride and at least one olefin, containing from 0.1% to 30% and preferably from 0.1% to 10% by weight of said olefin;

(b) comonomeric compositions based on vinyl chloride and vinyl acetate, comprising from 0.1% to 30% and preferably from 0.1% to 15% by weight of vinyl acetate; and (c) comonomeric compositions based on vinyl chloride and vinylidene chloride, comprising from 0.1% to 30% and preferably from 0.1% to 20% by weight of vinylidene chloride.

For good results according to the invention, an initiating system is used in which at least one of the constituents is insoluble in the organic phase of the reaction mixture, it being necessary for said constituent(s) to be soluble in the aqueous phase.

Representative such initiating systems are persalts, hydrogen peroxide, persalts or hydrogen peroxide associated with an inorganic or organic reducing agent such as salts of polyvalent metals and particularly of iron and of copper, rongalite, bisulfites, metabisulfites, thiosulfates, sulfinates, ascorbic acid, oses and others, systems in which one of the components is soluble in the monomeric or comonomeric composition and slightly soluble in water, the other component being soluble in water and insoluble in the monomeric or comonomeric composition, systems among which there may be mentioned: systems consisting of oxidizing agents such as peroxides, especially acetyl cyclohexanesulfonyl peroxide, hydroperoxides such as cumene and tertbutyl hydroperoxides, activated by reducing agents such as salts of polyvalent metals, particularly of iron or copper, and more especially by salts such as bisulfites, metabisulfites, thiosulfates, sulfinates, or organic reducing agents such as ascorbic acid, oses and others, systems of reducing components which are soluble in the monomeric or comonomeric composition and poorly soluble in water, such as benzoin, acetylacetonates, and oxidizing, activating components which are insoluble in the monomeric or comonomeric composition and soluble in water, such as persalts or hydrogen peroxide.

The initiating system generally constitutes from 0.01% to 1% and preferably from 0.02% to 0.1% by weight relative to the monomer(s) employed.

Also, the initiating system generally constitutes from 0.01% to 5% and preferably from 0.05% to 1.5% by weight relative to the water in the aqueous solution.

The polymerization reactions according to the invention may be carried out over a wide range of temperatures generally ranging from 0 to 100° C. and preferably from 50. to 70.C. However, it is also possible to conduct the polymerization operations at temperatures below or equal to 0° C., an antifreeze, such as particularly calcium chloride or a polyalcohol, being added beforehand to the aqueous solution of at least a part of the initiating system to be dispersed.

The polymers prepared by the process of the invention may, if desired, be recovered in the form of powder from the polymerization medium using techniques, the selection of which varies depending on whether the mean diameter of their particle sizes within the polymerizate does not exceed or is greater than a value of approximately 10 μm.

In the case where it is intended to prepare a polymer in the form of particles having a mean diameter not exceeding approximately 10 μm, a sufficient quantity of water is advantageously employed for the polymer to be in the form of a latex, that is to say, an aqueous dispersion of particles, after degassing of the unreacted monomeric or comonomeric composition. In such event, when the intended degree of conversion of the monomer(s) is reached, the polymerizate is generally subjected to a degassing treatment under stirring and the latex is thus obtained. In order to obtain the polymer in the form of dry powder, the latex may be treated by any known methods such as filtration, coagulation-dewatering, flaking, centrifugal separation and spraying.

In the event that it is intended to prepare a polymer in the form of particles having a mean diameter greater than approximately 10 μm, a polymer is obtained which is in the form of a wet powder or a slurry after removal of the monomeric or comonomeric liquid phase, depending, all other parameters remaining unchanged, on the quantity of water employed. In this case, when the intended degree of conversion of the monomer(s) is reached, in order to obtain the polymer in dry powder form, the polymerizate is generally subjected to a treatment, the nature of which depends essentially on the form of the polymer obtained after removal of the monomeric or comonomeric liquid phase. In the most general case, where the polymer is in the form of a wet powder, the polymerizate is usually subjected to an operation of both degassing and drying, which is carried out under stirring, and is intended to separate the water and the unreacted monomeric or comonomeric composition from the polymer or copolymer. In the case where the polymer is in the form of a slurry, the polymerizate may advantageously be subjected to a degassing operation carried out under stirring, the polymer may be separated from the polymerization medium by any known methods such as filtration, dewatering or centrifugal separation, and may then be subjected to a drying operation. The powdered polymer or copolymer obtained is then generally subjected to a screening operation intended to isolate the product within specification, defined as a product passing through a sieve with a given mesh opening, selected as a function of the mean diameter of the particles sought to be produced and of the application for which such particles are intended.

In order to further illustrate the present invention and the advantages thereof, the following specific examples are given, it being understood that same are intended only as illustrative and in nowise limitative.

In said examples to follow, Nos. 1, 4, 7, 9, 11, 13, 14, 15, 16, 18, 20, 22 and 24 are according to the invention; Nos. 2, 3, 5, 6, 8, 10, 12, 17, 19, 21, 23 and 25 are comparative.

A product within specification is defined as one passing through a screen having a mesh opening of 325 μm in Examples 1 to 8 and 12 to 25 and as passing through a screen having a mesh opening of 2,000 μm in Examples 9 and 10.

The viscosity index of the polymers and copolymers based on vinyl chloride was determined according to the ISO International Standard 174.

The apparent density of the polymers and copolymers was determined according to the French Standard NFT 51-003 (method A).

The plasticizer uptake at ambient temperature of the polymers and copolymers based on vinyl chloride was determined according to French Standard NFT 51-782.

EXAMPLE 1

550 g of vinyl chloride and an aqueous solution of 800 mg of potassium persulfate in 200 g of water were introduced, after evacuation, into a 1-liter capacity vertical reactor made of stainless steel, equipped with a jacket for circulating heat transfer fluid and with an anchor stirrer running close to the walls of the reactor and rotating at 250 rev/min, and the apparatus was purged by degassing 50 g of vinyl chloride.

The reaction mixture was heated to 56° C. over 45 minutes and maintained at 56° C., which corresponded to a relative pressure of 8.2 bars.

After 2.5 hours of polymerization at 56° C., degassing and drying, 125 g of polyvinyl chloride were collected.

EXAMPLE 2

The apparatus and the polymerization conditions were the same as in Example 1, except that the amount of water in the aqueous solution was 18 g.

After 2.5 hours of polymerization at 56° C., degassing and drying, 75 g of polyvinyl chloride were collected.

EXAMPLE 3

The apparatus and the polymerization conditions were the same as in Example 1, except that the amount of water in the aqueous solution was 18 g and the polymerization time at 56° C. was 5.5 hours.

After polymerization at 56° C., degassing and drying, 148 g of polyvinyl chloride were collected.

EXAMPLE 4

The apparatus was the same as in Example 1.

After evacuation, 550 g of vinyl chloride and an aqueous solution of 300 mg of potassium persulfate, 33 mg of ferric sulfate, 46.2 mg of hydrogen peroxide and 100 mg of ascorbic acid in 200 g of water were introduced into the reactor, whose stirrer was rotating at 250 rev/min, and the apparatus was purged by degassing 50 g of vinyl chloride.

The temperature of the reaction mixture was increased over 45 minutes and maintained at 70° C., which corresponded to a relative pressure of 11.5 bars.

After 15 minutes of polymerization at 70° C., degassing and drying, 75 g of polyvinyl chloride were collected.

EXAMPLE 5

The apparatus and the polymerization conditions were the same as in Example 4, except that the amount of water in the aqueous solution was 38 g.

After 15 minutes of polymerization at 70° C., degassing and drying, 50 g of polyvinyl chloride were collected.

EXAMPLE 6

The apparatus and the polymerization conditions were the same as in Example 4, except that the amount of water in the aqueous solution was 38 g and the polymerization time at 70° C. was 30 minutes.

After polymerization at 70° C., degassing and drying, 95 g of polyvinyl chloride were collected.

EXAMPLE 7

The apparatus was the same as in Example 1.

After evacuation, 550 g of vinyl chloride and an aqueous solution of 300 mg of potassium persulfate, 33 mg of ferric sulfate, 46.2 mg of hydrogen peroxide, 100 mg of ascorbic acid and 250 mg of sodium bistridecylsulfosuccinate in 150 g of water were introduced into the reactor, whose stirrer was rotating at 250 rev/min, and the apparatus was purged by degassing 50 g of vinyl chloride.

The temperature of the reaction mixture was increased over 45 minutes and maintained at 56° C., which corresponded to a relative pressure of 8.2 bars.

After 3 hours of polymerization at 56° C., degassing and drying, 275 g of polyvinyl chloride were collected.

EXAMPLE 8

The apparatus and the polymerization conditions were the same as in Example 7, except that the amount of water in the aqueous solution was 18 g and the polymerization time at 56° C. was 5.5 hours.

After polymerization at 56° C., degassing and drying, 150 g of polyvinyl chloride were collected.

EXAMPLE 9

The apparatus and the polymerization conditions were the same as in Example 1, except that the speed of rotating of the stirrer was 75 rev/min.

After 2.5 hours of polymerization at 56° C., degassing and drying, 120 g of polyvinyl chloride were collected.

EXAMPLE 10

The apparatus and the polymerization conditions were the same as in Example 9, except that the amount of water in the aqueous solution was 38 g.

After 2.5 hours of polymerization at 56° C., degassing and drying, 100 g of polyvinyl chloride were collected.

EXAMPLE 11

The apparatus was the same as in Example 1.

After evacuation, 400 g of acrylonitrile and an aqueous solution of 640 mg of potassium persulfate in 120 g of water were introduced into the reactor, whose stirrer was rotating at 250 rev/min.

The temperature of the reaction mixture was increased over 45 minutes and maintained at 70° C., which corresponded to an absolute pressure of 0.8 bar.

After 3 hours of polymerization at 70° C., degassing and drying, 300 g of polyacrylonitrile were collected.

EXAMPLE 12

The apparatus and the polymerization conditions were the same as in Example 11, except that the amount of water in the aqueous solution was 30.4 g.

After 3 hours of polymerization at 70° C., degassing and drying, 260 g of polyacrylonitrile were collected.

EXAMPLES 13 TO 17

After evacuation, each of the compounds, the identities and amounts of which are reported in Table I, per each example, was introduced into a 1-liter capacity vertical prepolymerizer made of stainless steel, equipped with a jacket for circulating heat transfer fluid, a turbine stirrer with 6 flat blades rotating at 700 rev/min and a baffle, and the apparatus was purged by degassing 50 g of vinyl chloride.

The temperature of the reaction mixture was increased over 45 minutes and maintained at 56° C., which corresponded to a relative pressure of 8.2 bars in the prepolymerizer.

After 5 minutes of prepolymerization, the degree of conversion being in the region of 18%, the reaction mixture was transferred into a 1-liter capacity vertical polymerizer, made of stainless steel and equipped with a jacket for circulating heat transfer fluid. The polymerizer was equipped with a stirrer consisting of a strip wound into helical turns running close to the polymerizer walls and fastened by means of three supports to a rotary shaft passing through the upper part of the polymerizer along its axis and, at its lower end, attached integrally to an arm matching the shape of the convex bottom of the polymerizer. The speed of stirring was controlled at 100 rev/min.

The temperature of the reaction mixture was increased over 30 minutes and maintained at 56° C., which corresponded to a relative pressure of 8.2 bars in the polymerizer. The polymerization time at 56° C. in the polymerizer and the amount of polyvinyl chloride collected after degassing and drying are also reported for each example in Table I.

TABLE I

|  |  | 13 | 14 | 15 | 16 | 17 |
|---|---|---|---|---|---|---|
| Vinyl chloride (g) | | 502 | 470 | 456 | 442 | 550 |
| Aqueous solution of: | | | | | | |
| (i) | potassium persulfate | 488 | 453.6 | 440 | 420 | 539.8 |

TABLE I-continued

|  | 13 | 14 | 15 | 16 | 17 |
|---|---|---|---|---|---|
| (mg) |  |  |  |  |  |
| (ii) ferric sulfate (mg) | 53.6 | 49.6 | 48 | 46 | 59.3 |
| (iii) hydrogen peroxide (mg) | 74.2 | 70 | 67.2 | 65.1 | 81.9 |
| (iv) ascorbic acid (mg) | 160 | 149.6 | 145 | 140 | 123.9 |
| in: |  |  |  |  |  |
| (v) water (g) | 90.4 | 126 | 142.1 | 156.8 | 38 |
| Polymerization time at 56° C. in the polymerizer (hr) | 4 | 2.5 | 1.3 | 2.5 | 2.5 |
| Amount of polyvinyl chloride collected (g) | 325.5 | 277.2 | 227.4 | 196 | 275 |

EXAMPLE 18

The apparatus was the same as in Example 13.

After evacuation, 442 g of vinyl chloride and an aqueous solution of 378 mg of potassium persulfate, 414 mg of ferric sulfate, 58.6 mg of hydrogen peroxide and 126 mg of ascorbic acid in 156.8 g of water were introduced into the prepolymerizer, whose stirrer was rotating at 700 rev/min, and the apparatus was purged by degassing 50 g of vinyl chloride.

The temperature of the reaction mixture was increased over 45 minutes and maintained at 56° C., which corresponded to a relative pressure of 8.2 bars in the prepolymerizer.

After 5 minutes of prepolymerization, the degree of conversion being in the region of 15%, the reaction mixture was transferred into the polymerizer containing 236 g of vinyl chloride. The speed of stirring was controlled at 100 rev/min.

The temperature of the reaction mixture was increased over 20 minutes and maintained at 56° C., which corresponded to a relative pressure of 8.2 bars in the polymerizer.

After 3.5 hours of polymerization at 56° C. in the polymerizer, degassing and drying, 395.7 g of polyvinyl chloride were collected.

EXAMPLE 19

The apparatus and the prepolymerization and polymerization conditions were the same as in Example 18, except that the amount of water in the aqueous solution was 29.8 g.

After 3.5 hours of polymerization at 56° C. in the polymerizer, degassing and drying, 383 g of polyvinyl chloride were collected.

EXAMPLE 20

The apparatus and the prepolymerization and polymerization conditions were the same as in Example 18, except that, in addition to vinyl chloride, 33 g of vinyl acetate were introduced into the prepolymerizer and the amount of water in the aqueous solution was 170 g.

After 3.5 hours of polymerization at 56° C. in the polymerizer, degassing and drying, 396.6 g of a copolymer of vinyl chloride and vinyl acetate were collected, consisting of 95.8% of vinyl chloride and 4.2% of vinyl acetate, by weight.

EXAMPLE 21

The apparatus and the prepolymerization and polymerization conditions were the same as in Example 20, except that the amount of water in the aqueous solution was 32.3 g.

After 3.5 hours of polymerization at 56° C. in the polymerizer, degassing and drying, 383 g of a copolymer of vinyl chloride and vinyl acetate were collected, consisting of 96% of vinyl chloride and 4% of vinyl acetate, by weight.

EXAMPLE 22

After evacuation, 17.6 kg of vinyl chloride and an aqueous solution of 15.36 g of potassium persulfate, 1.69 g of ferric sulfate, 2.39 g of hydrogen peroxide and 5.12 g of ascorbic acid in 6.485 kg of water were introduced into a 30-liter capacity vertical prepolymerizer made of stainless steel, equipped with a jacket for circulating heat transfer fluid, a turbine stirrer of the "Lightnin" type with 6 flat blades rotating at 680 rev/min and a baffle, and the apparatus was purged by degassing 1.6 kg of vinyl chloride.

The temperature of the reaction mixture was increased over 20 minutes and maintained at 56° C., which corresponded to a relative pressure of 8.2 bars in the prepolymerizer.

After 14 minutes of prepolymerization, the degree of conversion being in the region of 15%, the reaction mixture was transferred into a 70-liter capacity vertical polymerizer made of stainless steel, equipped with a jacket for circulating heat transfer fluid and containing 9.5 kg of vinyl chloride. The polymerizer was equipped with a stirrer consisting of a strip wound into helical turns running close to the polymerizer walls and fastened by means of three supports to a rotary shaft passing through the upper part of the polymerizer along its axis and, at its lower end, integral with an arm matching the shape of the convex bottom of the polymerizer. The speed of rotation was controlled at 100 rev/min.

The temperature of the reaction mixture was increased over 30 minutes and maintained at 56° C., which corresponded to a relative pressure of 8.2 bars in the polymerizer.

After 3.5 hours of polymerization at 56° C. in the polymerizer, degassing and drying, 17.1 kg of polyvinyl chloride were collected.

EXAMPLE 23

The apparatus and the prepolymerization and polymerization conditions were the same as in Example 22, except that the amount of water in the aqueous solution was 1.216 kg.

After 3.5 hours of polymerization at 56° C. in the polymerizer, degassing and drying, 15.7 kg of polyvinyl chloride were collected.

EXAMPLE 24

After evacuation, 114.4 kg of vinyl chloride and an aqueous solution of 99.84 g of potassium persulfate, 10.98 g of ferric sulfate, 15.561 g of hydrogen peroxide and 33.28 g of ascorbic acid in 41.6 kg of water were introduced into a 200-liter capacity vertical prepolymerizer made of stainless steel, equipped with a jacket for circulating heat transfer fluid, a turbine stirrer of the "Lightnin" type with 6 flat blades rotating at 525 rev/min and a baffle and the apparatus was purged by degassing 10.4 kg of vinyl chloride.

The temperature of the reaction mixture was increased over 20 minutes to 56° C., which corresponded to a relative pressure of 8.2 bars in the prepolymerizer.

After 14 minutes of prepolymerization, the degree of conversion being in the region of 14%, the reaction mixture was transferred into a 400-liter capacity vertical polymerizer made of stainless steel, equipped with a jacket for circulating heat transfer fluid and containing 62 kg of vinyl chloride. The polymerizer was equipped with two independently controlled stirrers, one A consisting of a strip wound into helical turns on a rotary shaft passing through the upper part of the polymerizer along its axis, the other B consisting of two arms matching the shape of the convex bottom of the polymerizer and connected to a pivot passing through the bottom of the polymerizer along its axis. The speed of stirrer A was controlled at 50 rev/min and that of stirrer B at 30 rev/min, in the opposite direction.

The temperature of the reaction mixture was increased over 30 minutes and maintained at 56° C., which corresponded to a relative pressure of 8.2 bars in the polymerizer.

After 3 hours of polymerization at 56° C. in the polymerizer, degassing and drying, 112.9 kg of polyvinyl chloride were collected.

EXAMPLE 25

The apparatus and the prepolymerization and polymerization conditions were the same as in Example 24, except that the amount of water in the aqueous solution was 7.9 kg.

After 3 hours of polymerization at 56° C. in the polymerizer, degassing and drying, 107.9 kg of polyvinyl chloride were collected.

In Table II are reported, for each example:

(a) the weight ratio of water to the monomeric or comonomeric composition initially employed;

(b) the degree of conversion of the monomer(s);

(c) the weight proportion of the product within specification; as well as, determined for product within specification:

(d) the viscosity index (where appropriate);

(e) the mean diameter of the particles;

(f) the apparent density; and (g) the plasticizer uptake at ambient temperature (where appropriate).

TABLE II

| EXAMPLES | Weight ratio water/monomeric or comonomeric composition initially employed (%) | Degree of conversion (%) | Weight proportion proportion of product within specification (%) | Viscosity index (ml/g) | Mean particle of diameter (μm) | Apparent density (g/cm³) | Plasticizer uptake at ambient temperature* |
|---|---|---|---|---|---|---|---|
| 1 | 40 | 25 | 96.5 | 123 | 160 | 0.15 | 85 |
| 2 | 3.6 | 15 | 90.2 | 115 | 166 | 0.37 | 28 |
| 3 | 3.6 | 29.6 | 90.1 | 123 | 186 | 0.56 | 11 |
| 4 | 40 | 15 | 97.4 | 98 | 140 | 9.19 | 82 |
| 5 | 7.6 | 10 | 91.4 | 97 | 134 | 0.36 | 56 |
| 6 | 7.6 | 19 | 91.4 | 93 | 115 | 0.47 | 28 |
| 7 | 30 | 55 | 96.7 | 123 | 92 | 0.56 | 22 |
| 8 | 3.6 | 30 | 98.0 | 120 | 97 | 0.39 | 14 |
| 9 | 40 | 24 | 88.0 | 125 | 1050 | 0.20 | 68 |
| 10 | 7.6 | 20 | 85.0 | 125 | 1000 | 0.65 | 12 |
| 11 | 30 | 75 | 82.5 | — | 50 | 0.40 | — |
| 12 | 7.6 | 65 | 80.2 | — | 48 | 0.56 | — |
| 13 | 20 | 72 | 90.2 | 121 | 141 | 0.59 | 19 |
| 14 | 30 | 66 | 92.0 | 123 | 154 | 0.55 | 24 |
| 15 | 35 | 56 | 94.6 | 121 | 177 | 0.55 | 24 |
| 16 | 40 | 50 | 95.7 | 124 | 162 | 0.25 | 40 |
| 17 | 7.6 | 55 | 90.5 | 120 | 180 | 0.79 | 7 |
| 18 | 40 | 63 | 92.5 | 122 | 250 | 0.58 | 30 |
| 19 | 7.6 | 61 | 91.5 | 120 | 225 | 0.80 | 6 |
| 20 | 40 | 60 | 85.2 | 112 | 160 | 0.62 | 25 |
| 21 | 7.6 | 55 | 80.5 | 110 | 155 | 0.79 | 5 |
| 22 | 40 | 67 | 94.8 | 124 | 141 | 0.56 | 33 |
| 23 | 7.6 | 62 | 92.5 | 122 | 125 | 0.82 | .6 |
| 24 | 40 | 68 | 94.6 | 127 | 155 | 0.57 | 22 |
| 25 | 7.6 | 65 | 94.2 | 128 | 135 | 0.81 | 4 |

*expressed in g of di-2-ethylhexyl phthalate per 100 g of resin

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a polymer insoluble in its monomeric constituents, comprising suspended emulsion polymerizing at least one olefinic monomer, said at least one monomer having dispersed therein finely divided droplets of an aqueous solution of at least one component of a polymerization initiating system, and wherein the amount of water in said aqueous solution constitutes at least 19% by weight of said at least one monomer.

2. The process as defined by claim 1, wherein the amount of water in said aqueous solution constitutes at least by weight of said at least one monomer.

3. The process as defined by claim 1, wherein the amount of water in said aqueous solution constitutes not more than 100% by weight of said at least one monomer.

4. The process as defined by claim 1, wherein the amount of water in said aqueous solution constitutes not more than 50% by weight of said at least one monomer.

5. The process as defined by claim 1, carried out in a single stage under moderate stirring.

6. The process as defined by claim 1, comprising suspended emulsion polymerizing said at least one monomer in a first stage, under high-turbulence stirring to a degree of conversion of from 1% to 50%, optionally adding additional monomer to said first stage reaction mixture, and continuing said suspended emulsion polymerizing in a second stage, under mild stirring, but sufficient to prevent reagglomeration of developing polymer particles.

7. The process as defined by claim 1, comprising suspended emulsion polymerizing said at least one monomer in a first stage in a prepolymerization reaction zone, under high-turbulence stirring to a degree of conversion of from 1% to 30%, and completing said suspended emulsion polymerizing in a second stage, under mild stirring, but sufficient to prevent reagglomeration of developing polymer particles.

8. The process as defined by claim 7, comprising adding additional monomer to the reaction mixture between said first and second stages.

9. The process as defined by claim 6, comprising conducting said first stage polymerization to a degree of conversion of from 3% to 25%.

10. The process as defined by claim 7, comprising conducting said first stage prepolymerization to a degree of conversion of from 3% to 15%.

11. The process as defined by claim 1, comprising dissolving at least one component of said polymerization initiating system in said at least one monomer.

12. The process as defined by claim 1, said at least one monomer having dispersed therein finely divided droplets of at least two different aqueous solutions, each having different components of a polymerization initiating system dissolved therein.

13. The process as defined by claim 1, wherein the polymerization reaction medium comprises an emulsifier.

14. The process as defined by claim 13, said emulsifier comprising a quaternary ammonium salt, a fatty acid soap, an alkali metal alkyl sulfate, an alkali metal alkylsulfonate, an alkali metal alkylarylsulfonate, an alkali metal alkylsulfosuccinate, an alkali metal alkyl phosphate, or a polycondensate of ethylene and/or propylene oxide with a hydroxylated organic compound.

15. The process as defined by claim 1, wherein the polymerization reaction medium comprises at least one suspension agent.

16. The process as defined by claim 15, said at least one suspension agent comprising a polyvinyl alcohol, a cellulose derivative or a gelatin.

17. The process as defined by claim 1, said at least one olefinic monomer comprising vinyl chloride, vinylidene chloride, vinyl acetate, acrylonitrile, vinylidene fluoride, tetrafluoroethylene, chlorotrifluoroethylene, an alkyl acrylate, an alkyl methacrylate or an olefin.

18. The process as defined in claim 17, said at least on olefinic monomer comprising vinyl chloride along, a mixture of vinyl chloride and at least one olefin, a mixture of vinyl chloride and vinyl acetate, a mixture of vinyl chloride, vinyl acetate and at least one olefin, or a mixture of vinyl chloride and vinylidene chloride.

19. The process as defined by claim 1, said polymerization initiating system comprising at least one component that is insoluble in the organic phase of the reaction mixture.

20. The process as defined by claim 1, said polymerization initiating system comprising a persalt, hydrogen peroxide, a persalt or hydrogen peroxide associated with an inorganic or organic reducing agent, a system in which one of the components is soluble in the at least one monomer and slightly soluble in water, the other component being soluble in water and insoluble in the at least one monomer, or a system of reducing components which are soluble in the at least one monomer and poorly soluble in water, and activation oxidizing components which are insoluble in the at least one monomer and soluble in water.

21. The process as defined by claim 20, said polymerization initiating system comprising from 0.01 to 1% by weight of the at least one monomer.

22. The process as defined by claim 21, said polymerization initiating system comprising from 0.01 to 5% by weight of the water in said aqueous solution.

23. The process as defined by claim 1, for the preparation of polyvinyl chloride.

24. The process as defined by claim 23, said polyvinyl chloride comprising particulates having a mean diameter greater than 10 μm and a di-2-ethylhexylphthalate plasticizer uptake at ambient temperature of at least 20 g per 100 g of resin.

25. The process as defined by claim 23, said polyvinyl chloride comprising particulates having a mean diameter greater than 10 μm and a di-2-ethylhexylphthalate plasticizer uptake at ambient temperature of at least 30 g per 100 g of resin.

26. The process as defined by claim 1, carried out to a degree of monomer conversion of at least 50%.

* * * * *